United States Patent
Shipman

(10) Patent No.: US 7,346,015 B2
(45) Date of Patent: Mar. 18, 2008

(54) METHOD AND APPARATUS FOR ROUTING DATA WITH SUPPORT FOR CHANGING MOBILITY REQUIREMENTS

(75) Inventor: Robert A Shipman, Ipswich (GB)

(73) Assignee: British Telecommunications public limited company, London (GB)

( * ) Notice: Subject to any disclaimer, the term of this patent is extended or adjusted under 35 U.S.C. 154(b) by 511 days.

(21) Appl. No.: 10/480,143

(22) PCT Filed: May 30, 2002

(86) PCT No.: PCT/GB02/02626

§ 371 (c)(1),
(2), (4) Date: Dec. 10, 2003

(87) PCT Pub. No.: WO03/003670

PCT Pub. Date: Jan. 9, 2003

(65) Prior Publication Data

US 2004/0218528 A1    Nov. 4, 2004

(30) Foreign Application Priority Data

Jun. 29, 2001 (EP) ............... 013056536

(51) Int. Cl.
*H04B 7/00* (2006.01)
(52) U.S. Cl. .................................. 370/310
(58) Field of Classification Search ......... 370/468, 370/338, 312, 229–237, 241, 242, 248–250, 370/252, 253, 310, 351–356, 389, 390
See application file for complete search history.

(56) References Cited

U.S. PATENT DOCUMENTS

| | | | | |
|---|---|---|---|---|
| 5,218,601 A | * | 6/1993 | Chujo et al. | 370/228 |
| 5,412,654 A | * | 5/1995 | Perkins | 370/312 |
| 5,488,609 A | * | 1/1996 | Hluchyj et al. | 370/232 |
| 5,499,237 A | * | 3/1996 | Richetta et al. | 370/400 |
| 5,590,405 A | * | 12/1996 | Daly et al. | 455/504 |
| 5,612,948 A | * | 3/1997 | Fette et al. | 370/252 |
| 5,790,522 A | * | 8/1998 | Fichou et al. | 370/236 |
| 5,835,485 A | * | 11/1998 | Grube et al. | 370/312 |
| 5,963,548 A | * | 10/1999 | Virtanen | 370/335 |
| 5,987,011 A | * | 11/1999 | Toh | 370/331 |
| 6,049,533 A | * | 4/2000 | Norman et al. | 370/328 |
| 6,064,678 A | * | 5/2000 | Sindhushayana et al. | 370/470 |

(Continued)

OTHER PUBLICATIONS

Royer et al, "A Review of Current Routing Protocols for Ad Hoc Mobile Wireless Networks", IEEE Personal Communications, IEEE Communications Society, US, vol. 6, No. 2, Apr. 1999, pp. 46-55.

(Continued)

*Primary Examiner*—Dmitry Levitan
(74) *Attorney, Agent, or Firm*—Nixon & Vanderhye P.C.

(57) ABSTRACT

A method of operating a wireless network with a base station and a plurality of outstations comprising
i. transmitting a broadcast signal from the base station;
ii. monitoring operational status of outstations in the wireless network from an outstation,
iii. collecting data representative of outstation status,
iv. in response to reception of the broadcast signal, transmitting an acknowledgement signal from the outstation;
  wherein an outstation relaying an acknowledgement signal appends to the acknowledgement signal data representative of the collected data, and
  wherein the base station, upon receipt of an acknowledgement signal, retrieves the collected data and varies the rate at which signals are broadcast from the base station in accordance with the collected data.

7 Claims, 13 Drawing Sheets

U.S. PATENT DOCUMENTS

| | | | |
|---|---|---|---|
| 6,078,568 A * | 6/2000 | Wright et al. | 370/312 |
| 6,097,733 A * | 8/2000 | Basu et al. | 370/468 |
| 6,181,683 B1 * | 1/2001 | Chevillat et al. | 370/329 |
| 6,205,129 B1 * | 3/2001 | Esteves et al. | 370/331 |
| 6,229,795 B1 * | 5/2001 | Pankaj et al. | 370/329 |
| 6,252,854 B1 * | 6/2001 | Hortensius et al. | 370/252 |
| 6,260,072 B1 * | 7/2001 | Rodriguez-Moral | 709/241 |
| 6,349,210 B1 * | 2/2002 | Li | 455/450 |
| 6,532,368 B1 * | 3/2003 | Hild et al. | 455/515 |
| 6,535,498 B1 * | 3/2003 | Larsson et al. | 370/338 |
| 6,542,736 B1 * | 4/2003 | Parkvall et al. | 455/452.2 |
| 6,577,609 B2 * | 6/2003 | Sharony | 370/312 |
| 6,587,471 B1 * | 7/2003 | Bass et al. | 370/432 |
| 6,621,805 B1 * | 9/2003 | Kondylis et al. | 370/329 |
| 6,704,293 B1 * | 3/2004 | Larsson et al. | 370/255 |
| 6,704,301 B2 * | 3/2004 | Chari et al. | 370/351 |
| 6,741,564 B2 * | 5/2004 | Luddy | 370/232 |
| 6,785,510 B2 * | 8/2004 | Larsen | 455/11.1 |

OTHER PUBLICATIONS

Hubner et al, "A Multihop Protocol for Contacting a Stationary Infrastructure", 1991 IEEE 4th Vehicular Technology Conference, St. Louis, May 19-22, 1991, IEEE Vehicular Technology Conference, New York, IEEE, US, vol. CONF. 41, May 19, 1991, pp. 414-419.

Lee et al, "A Simulation Study of Table-Driven and On-Demand Routing Protocols for Mobile Ad Hoc Networks", IEEE Network, IEEE Inc., New York, US, Jul. 1999, pp. 48-54.

* cited by examiner

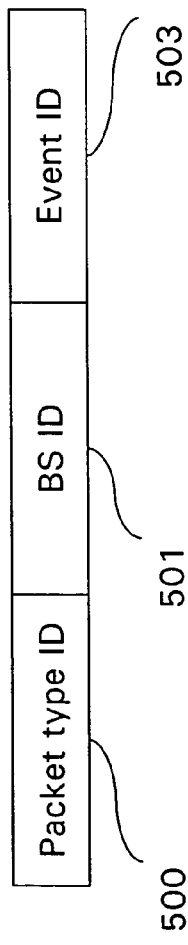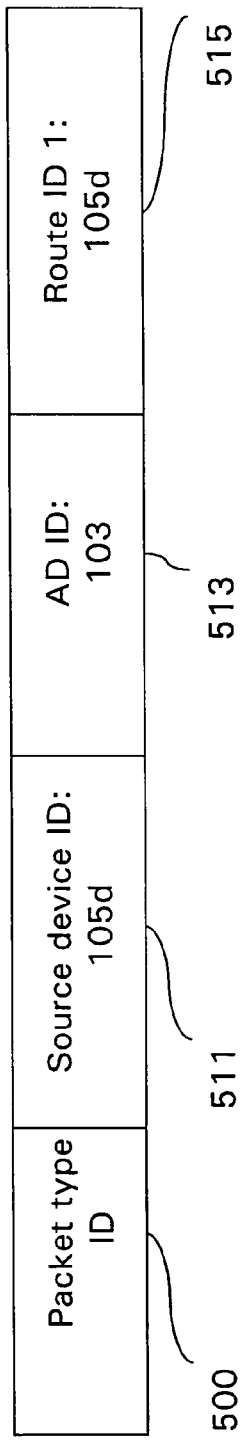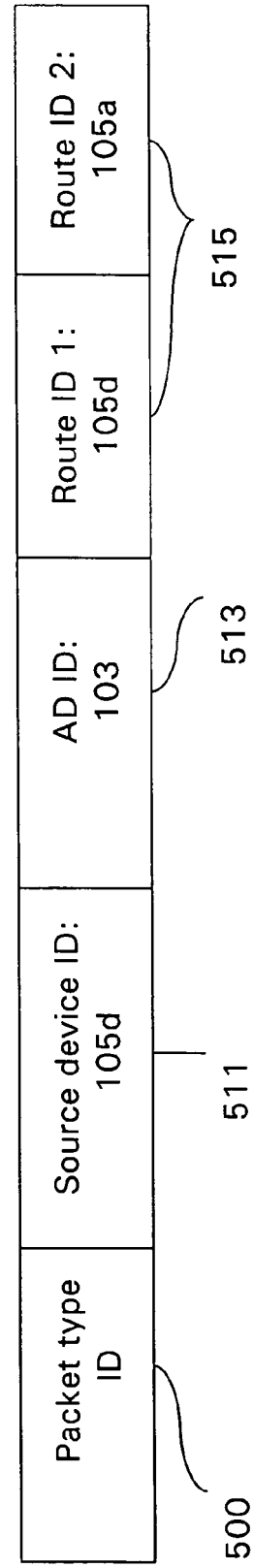

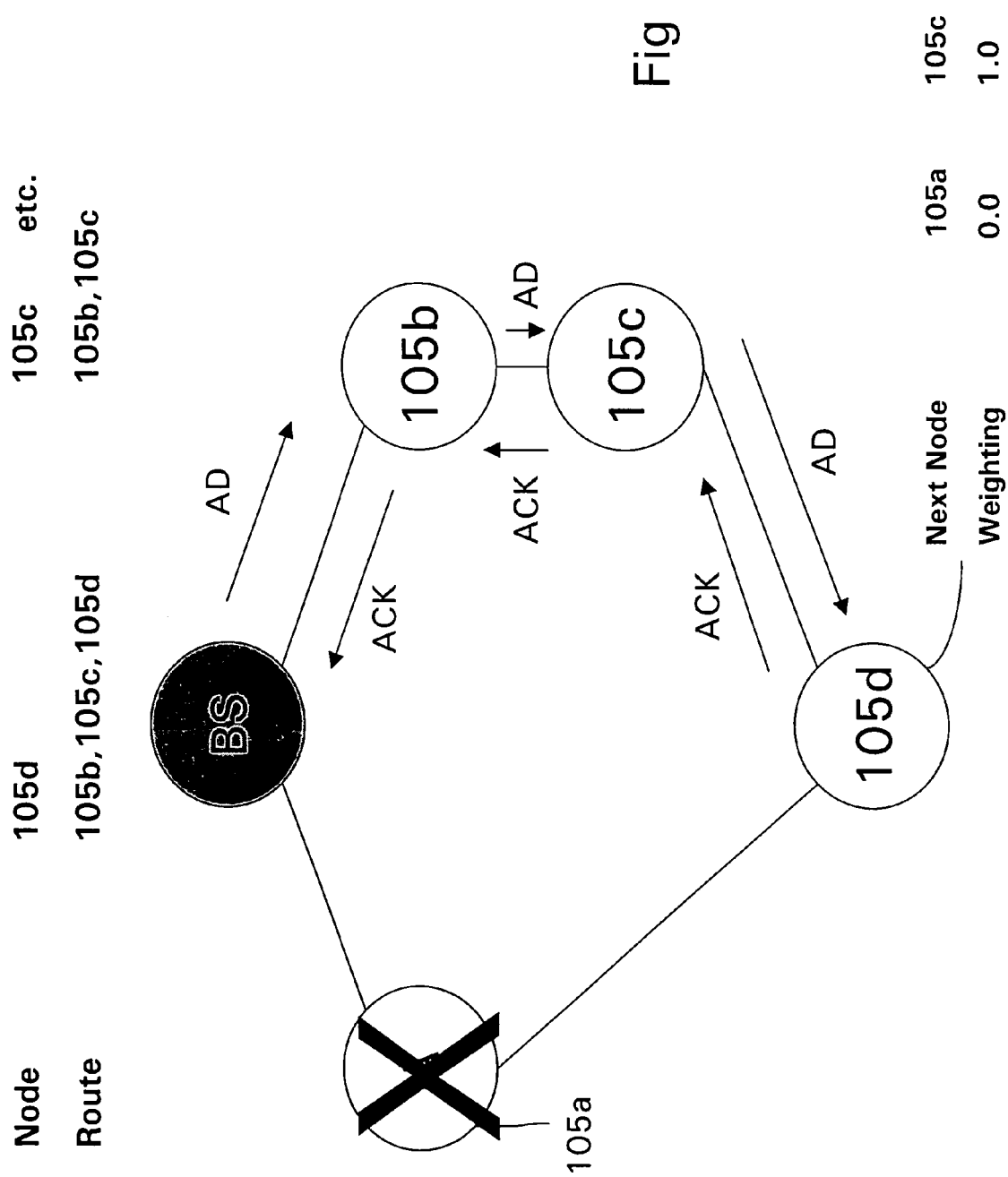

$$Freq = \frac{Max}{1+e^{-k(x-l)}}$$

METHOD AND APPARATUS FOR ROUTING DATA WITH SUPPORT FOR CHANGING MOBILITY REQUIREMENTS

This application is the US national phase of international application PCT/GB02/02626 filed 30 May 2002 which designated the U.S., the entire content of which is hereby incorporated by reference.

TECHNICAL FIELD

The present invention relates to methods of, and apparatus for, routing through a network, and has particular application in routing through wireless networks.

BACKGROUND TO THE INVENTION AND PRIOR ART

Wireless network technology is maturing, and base stations, which receive, buffer, and transmit data between a wireless network and a fixed network, are increasingly being installed in offices, homes and public places such as coffee shops, restaurants and airports.

With traditional wireless technology, only devices that are within range of a base station can send data to, and receive data from, the fixed network. Given the potential demand for wireless connections—in terms of volume and location—there has been significant motivation to develop capabilities that effectively extend the range of the base station.

One known approach creates a path between out-of-range devices and the base station by setting up peer-to-peer communications between wireless devices in the path. In this scenario, the wireless devices in the path essentially act as relays between the out-of-range device and the base station. For more information, the reader is referred to documents prepared by the mobile ad-hoc networking group (MANET), which is a working group within the Institute of the Internet Engineering Task Force (IETF), and can be contacted via IETF Secretariat, c/o Corporation for National Research Initiatives, 1895 Preston White Drive, Suite 100, Reston, Va. 20191-5434, USA. An example of such documents can be found from the IETF which has an http website www.ietf.org.

In this approach, some means of establishing routes via the path of relay devices is required to reach the out-of-range devices. Given the differences between fixed and mobile networks, conventional routing methods, which are suitable for fixed networks, are unsuitable for routing through relay devices.

SUMMARY OF THE INVENTION

According to a first aspect of the invention there is provided a method of operating a wireless network with a base station and a plurality of outstations comprising
 i. transmitting a broadcast signal from the base station;
 ii. monitoring operational status of outstations in the wireless network from an outstation,
 iii. collecting data representative of outstation status,
 iv. in response to reception of the broadcast signal, transmitting an acknowledgement signal from the outstation;
  wherein an outstation relaying an acknowledgement signal appends to the acknowledgement signal data representative of the collected data, and
  wherein the base station, upon receipt of an acknowledgement signal, retrieves the collected data and varies the rate at which signals are broadcast from the base station in accordance with the collected data.

According to a second aspect of the invention there is provided a method of varying the rate at which signals are broadcast into a wireless network, wherein the signals are broadcast to facilitate route identification, the method comprising the steps of:
 receiving data representative of the status of at least one wireless device in the wireless network, and
 modifying the rate at which signals are broadcast in accordance with the received data.

Conveniently this method can be used to identify a route to a wireless device in the wireless network, specifically to control a rate at which broadcast signals are sent into the wireless network. The method for identifying a route comprises the steps of:
 sending a broadcast signal into the wireless network at a rate determined by the afore-mentioned method,
 receiving an acknowledgement signal generated in response to receipt of the broadcast signal, and
 storing identifiers representative of the, or each, wireless device passed through by the acknowledgement signal,
 wherein the stored identifiers collectively define a route between the base station and whichever device generated the acknowledgement signal.

According to a third aspect of the invention there is provided a method of monitoring wireless device activity in a wireless network, for use in varying the rate at which signals are broadcast into a wireless network, the method comprising the steps of
 monitoring operational status of devices in the wireless network,
 collecting data representative of device status, and
 outputting the collected data, for use in modifying the rate at which signals are broadcast into a wireless network.

Preferably the output data is sent to a base station corresponding to the wireless network, and the base station broadcasts signals into the wireless network to facilitate route identification.

Conveniently this step of sending data to the base station comprises selecting a neighbouring device in accordance with a routing table, which comprises preference values for sending data via neighbouring devices. Preferably a preference value corresponding to a neighbouring device is modified, at least in part, in dependence on time taken for signals to reach the device via that neighbouring device.

According to the invention there is further provided apparatus to effect the methods described above.

In the following description, the terms "wireless device" and "device" are used interchangeably.

BRIEF DESCRIPTION OF THE DRAWINGS

Further aspects and advantages of the present invention will be apparent from the following description of preferred embodiments of the invention, which are given by way of example only and with reference to the accompanying drawings, in which

FIG. 5a is a schematic diagram showing constituent parts of an advertisement packet generated according to an embodiment of the invention;

FIG. 5b is a schematic diagram showing constituent parts of an acknowledgement packet generated according to the an embodiment of invention;

FIG. 5c is a schematic diagram showing constituent parts of an updated acknowledgement packet generated according to an embodiment of the invention;

FIG. 7 is a schematic diagram illustrating aspects of the method of FIG. 3;

OVERVIEW OF ENVIRONMENT FOR EMBODIMENTS OF THE INVENTION

Figure 1:
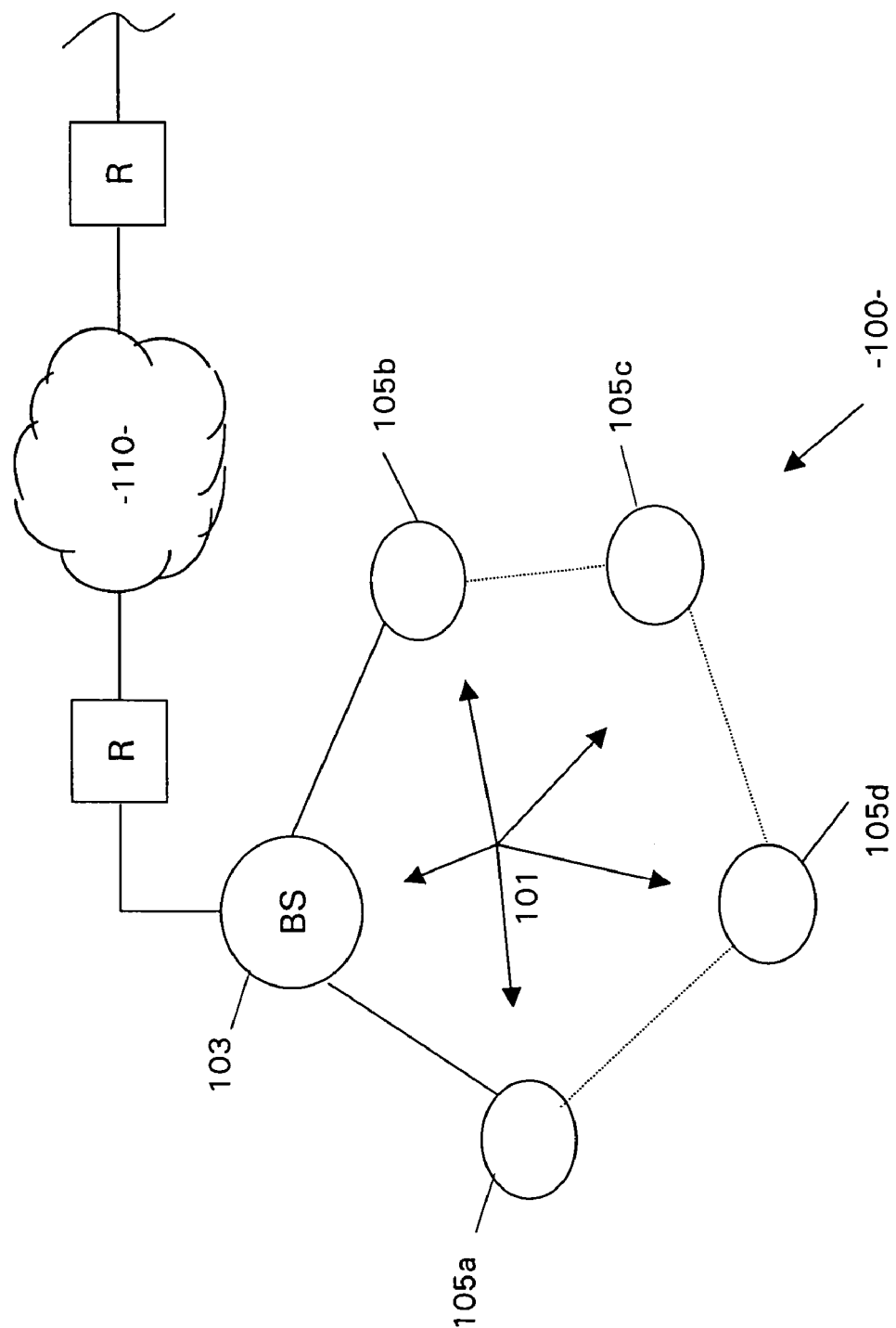
FIG. 1 is a schematic diagram of a wireless network, within which embodiments of the invention operate.

FIG. 1 shows a wireless network 100, including nodes 101 that are representative of a base station 103 and a plurality of devices 105a, 105b, 105c, 105d. The base station 103 connects to a wired network 110 from a fixed location using standard cabling. Typically, the base station 103 receives, buffers, and transmits data between the wireless network 100 and a wired network 110 infrastructure. A single base station 103 can directly or indirectly support a group of devices 105a, 105b, 105c, 105d (referred to generally as 105, or 105i, below).

The network 100 could be a wireless Local Area Network, in which case the nodes 101 intercommunicate in accordance with the collection of 802.11 Institute of Electrical Engineers (IEEE) standards.

The 802.11 IEEE standards include three specifications, 802.11, 802.11a and 802.11b. For the 802.11 and 802.11b specifications, data is transferred at frequencies in the 2.4 GHz region of the radio spectrum. Data rates are generally 1 or 2 Mbps for 802.11, and 5.5 Mbps or 11 Mbps for 802.11b, although rates up to about 20 Mbps are realizable with 802.11b.

The 802.11a specification applies to wireless ATM systems and operates at radio frequencies between 5 GHz and 6 GHz. With a modulation scheme known as OFDM (orthogonal frequency-division multiplexing) data speeds as high as 54 Mbps are possible, but most commonly, communications takes place at 6 Mbps, 12 Mbps, or 24 Mbps. More information is available from the Institute of Electrical Engineers Standards Association, and details of this standard are documented by the IEEE which has a http website at ieee.org.

The network 100 could be any type of short-range communications network, such as a 3-G network, a bluetooth network, or a GSM network. The devices 105 may include palmtop computers, desktop computers, hand-held computers, simple devices operable to receive and transmit SMS messages and mobile phones, among others The devices 105 have wireless network adapters, such as wireless LAN adapters, which are implemented as PC cards in notebook or palmtop computers, as cards in desktop computers, or integrated within hand-held computers. Wireless network adapters provide an interface between a device network operating system (NOS) and the airwaves via an antenna.

Devices 105 can move around and communications will continue, unbroken, provided the devices 105 can directly connect to a base station. In order to extend the capability of the wireless network 100 infrastructure, wireless capabilities of other wireless devices in the neighbourhood can be exploited by using one or more devices to relay messages to the base station. Embodiments of the present invention are concerned with methods of routing data via these relay devices.

In a fixed network 110, in particular a packet switched network, packets are routed through the network 110 by means of routing tables, which are stored on routers R in the network 110 and list "next hop" devices as a function of destination address. In operation, a router examines the destination address of an incoming packet, and, by consulting the routing table, identifies which "next hop" device to forward the packet to. This method is well suited to fixed networks 110, where devices are typically static, and the frequency at which routing tables need to be updated, to accommodate changes in the network, is manageable.

Wireless networks, however, are designed to provide users with access to information from any location. This means that such users, and importantly their devices, may only be in the vicinity of a base station 103 for a short, and unpredictable, period of time. It is therefore impractical to maintain routes using the routing table method described above, as the frequency required to update the routing table in order to capture these changes, is unacceptably high.

Embodiments of the invention are therefore also concerned with providing route identification and delivery methods and apparatus that are suited to the dynamic nature of wireless networks.

OVERVIEW OF EMBODIMENTS OF THE INVENTION

Essentially the base station 103 advertises its presence by sending advertisement packets into the wireless network 100 at intervals. Each device 105i (where i identifies a specific device) maintains a routing table to the base station 103, which details active next hop devices en route to the base station 103. Upon receipt of an advertisement packet, devices 105i send an acknowledgement packet back to the base station using the routing tables to identify a suitable next hop device. The route taken by acknowledgement packets thus only involves devices that are active in the network 100.

Embodiments of the invention are particularly concerned with minimising network traffic generated by the advertisement packets.

Specifically, embodiments of the invention modify the frequency with which the base station 103 issues advertisement packets, or the temporal interval that passes between broadcast events (broadcast of advertisement packets), in dependence on devices connecting and disconnecting to the wireless network. These embodiments include a mechanism for determining changes in the wireless environment, and for modifying this temporal interval in accordance therewith.

Such changes in a wireless network 100, arising from, e.g. devices connecting and disconnecting to the wireless network 100, are monitored by devices 105*i* themselves. In one embodiment a devices 105*i* counts numbers of failures to connect to neighbouring devices (e.g. because a former neighbouring device has recently moved away), and sends this information to the base station when the device 105*i* generates acknowledgement packets. The base station then estimates an average number of failures over the network 100 and uses it to modify the advertisement frequency.

Embodiments are also used to identify routes to operational devices: each time the acknowledgement packet passes through a device 105*i* (on its way to the base station 103), the device 105*i* appends its address to the acknowledgement packet. Thus, by the time the acknowledgement packet has arrived at the base station 103 the packet contains a valid route from base station 103 to whichever device initiated the acknowledgement packet. The base station 103 saves this route information and stores it as a valid route for whichever device 105 created the acknowledgement packet.

When packets arrive from the fixed network 110, destined for one of the devices 105*d*, say, the base station 103 identifies which of the routes corresponds to the destined device 105*d*, appends the identified route to the incoming packet, and sends the packet into the wireless network 100.

An advantage of embodiments of the invention is that route identification is self-organising and dynamic, as it is based on advertisement and acknowledgement packets issued by the base station 103 and active devices 105 respectively, which, by definition, can only propagate through active devices, and are issued periodically.

In terms of resource usage, an advantage of embodiments of the invention is that device requirements can be reduced, as most of the route processing is performed by the base station.

One of the concepts underlying embodiments of the invention is that devices alert the base station when they want to receive data i.e. "data on demand". Thus a device that wants to be available for calls/data to be routed to it generates acknowledgement packets. Conversely a device can disallow any calls/data to be routed to it by not generating acknowledgement packets (as this has the effect that the base station has no way of knowing how to route data to such devices).

DESCRIPTION OF THE EMBODIMENTS

Figure 2:
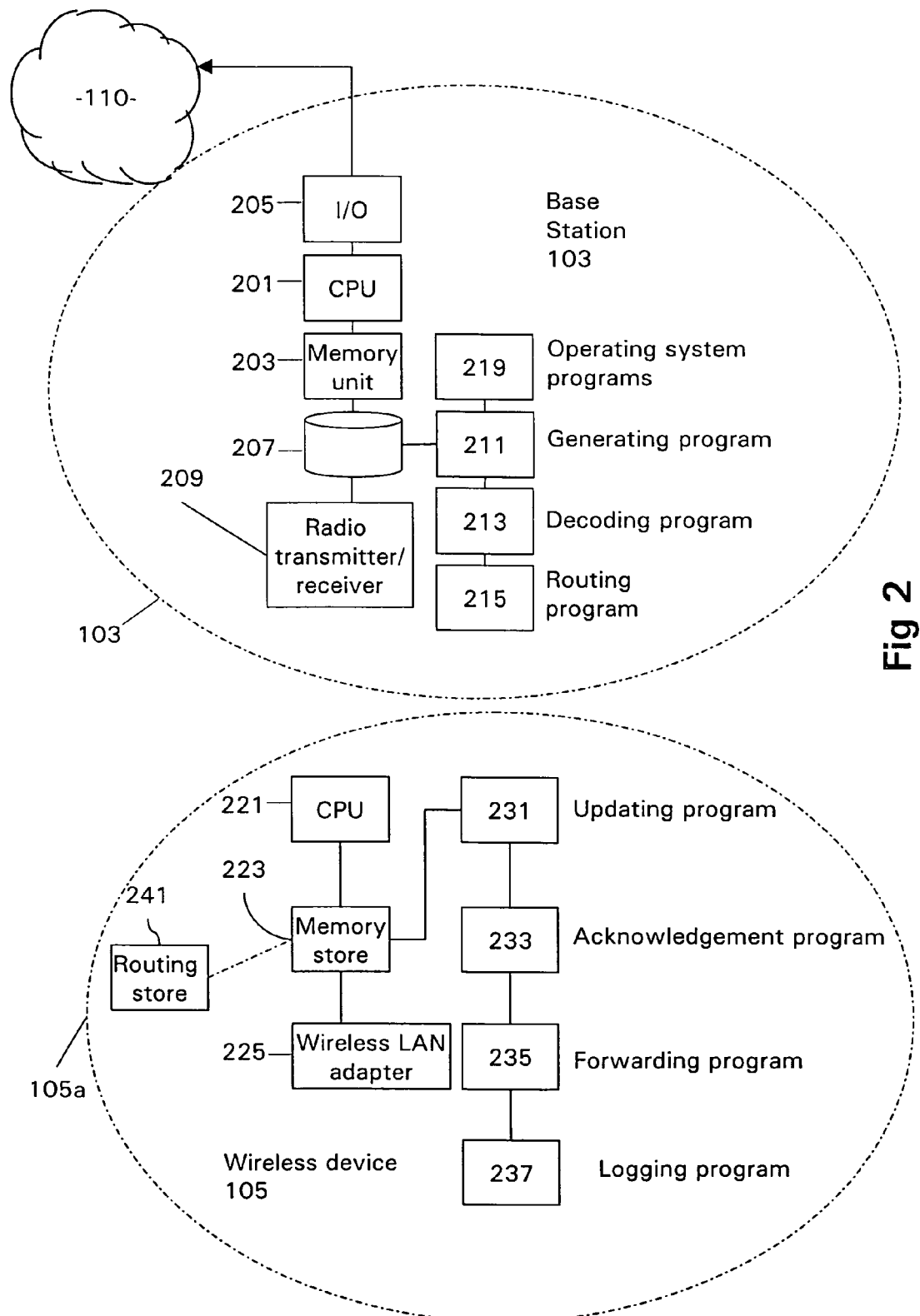
FIG. 2 is a schematic diagram of components of a base station and a device comprising part of the wireless network of FIG. 1.

Referring to FIG. 2, a first embodiment of the invention will now be discussed in more detail.

FIG. 2 shows a base station 103, which can be a wireless router, comprising a central processing unit (CPU) 201, a memory unit 203, an input/output device 205 for connecting the base station 103 to the fixed network 110, storage 207, a radio transmitter and receiver 209, and a suite of operating system programs 219, which control and co-ordinate low level operation of the base station 103. Such a configuration is well known in the art. The storage 207 also stores programs 211, 213, 215 that are processable by the CPU 201.

These programs include a generating program 211 for generating advertisement packets, a decoding program 213 for decoding acknowledgment packets, and a routing program 215 for routing incoming data packets to an appropriate wireless device 105.

The decoding program 213 enables the base station 103 to store routes to each (active) device 105 on the wireless network 100, and the routing program 215 enables the base station 103 to identify, on the basis of the destination address of incoming data packet(s), one of the stored routes, and to append the identified route to the incoming data packet(s).

FIG. 2 also shows an example of a wireless device 105, which, as stated above, can be a palmtop computer. A wireless device 105 typically comprises at least a processing unit 221, a memory store 223 and a wireless-LAN adapter 225 (as stated above). The basic configuration of a particular wireless device 105 varies in accordance with device type, and is well known to those in the art. In order to function in accordance with embodiments of the invention, the memory store 223 stores an updating program 231 for updating a routing table detailing "next hop" devices to the base station 103, an acknowledgement program 233 for sending acknowledgement packets to the base station 103, and a forwarding program 235 for forwarding packets on to other devices in the wireless network 100. These programs 231, 233, 235 can be processed by the processing unit 221.

The updating program 231 enables a device 105*a* to select an active "next hop" device for transmission of data to the base station 103, and the acknowledgement program 233 enables the device 105*a* to generate acknowledgement packets in response to advertisement packets received by the device 105*a*. In addition, the acknowledgement program 233 enables the device 105*a* to append an identifier representative of the device 105*a* to an acknowledgement packet, which is en route for the base station 103, and which has been generated by another device upstream of that device 105*a* (e.g. referring to FIG. 1, device 105*d*).

Figure 3A:
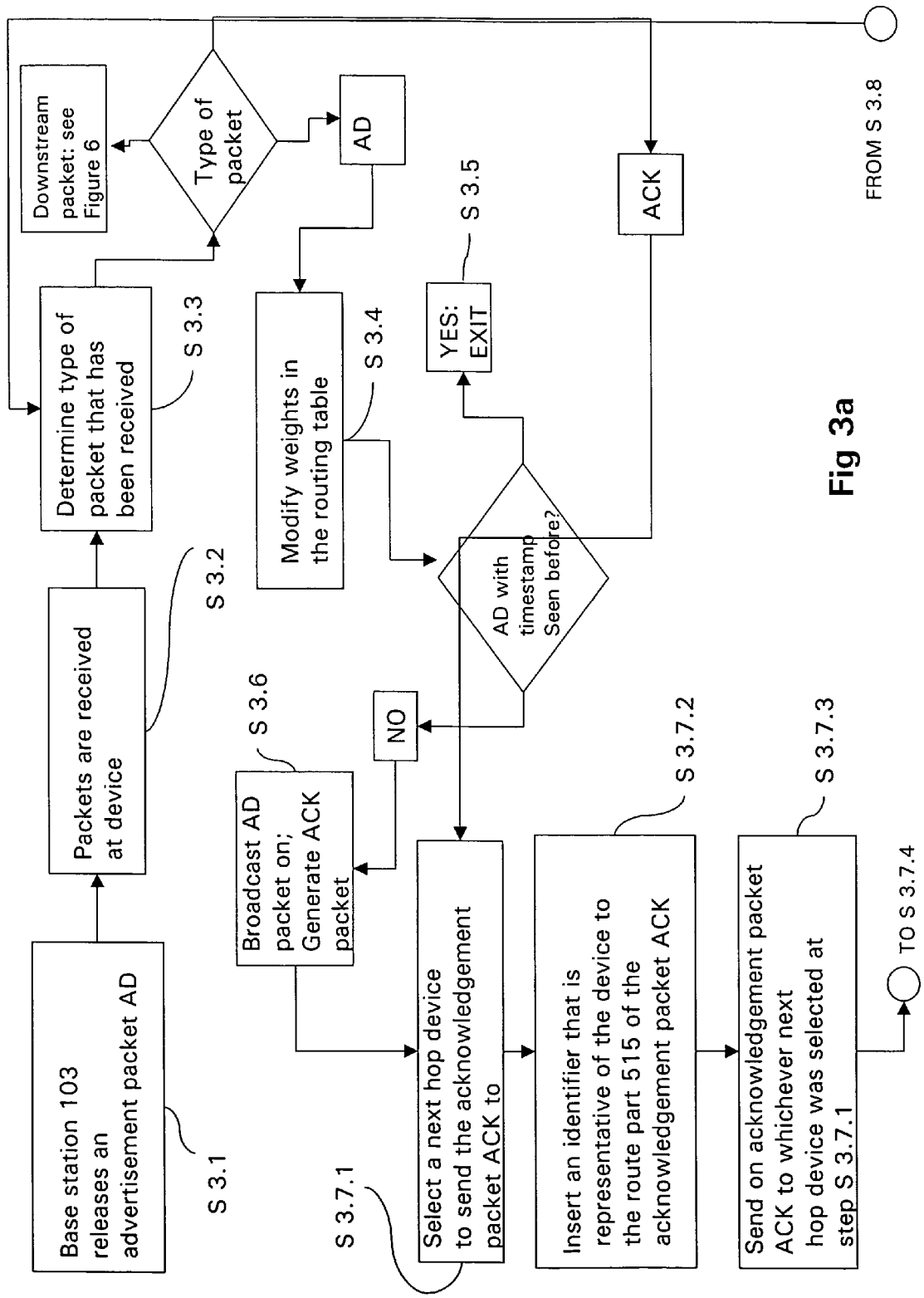
FIGS. 3a and 3b constitute a flow diagram showing a method of establishing a route to wireless devices in a wireless network according to an embodiment of the invention.
Figure 3B:
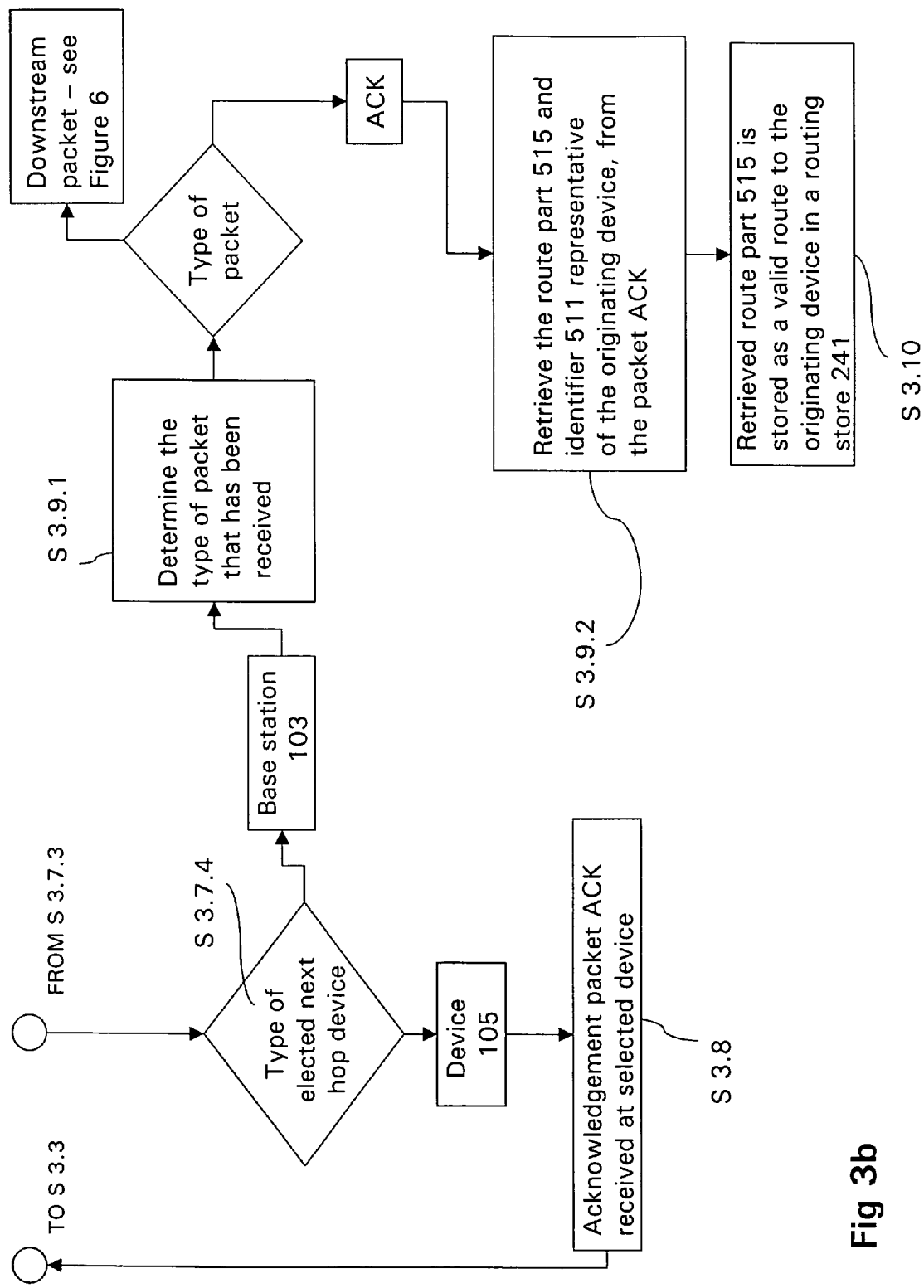

The operation of the base station 103 and devices 105 according to an embodiment of the invention will now be described with reference to the flowchart shown in FIGS. 3*a* and 3*b* and the schematic diagrams shown in FIGS. 4*a* and 4*b*. FIGS. 3*a* and 3*b* show steps carried out by both devices 105 and the base station 103 when determining a route to a wireless device.

Figure 4A:
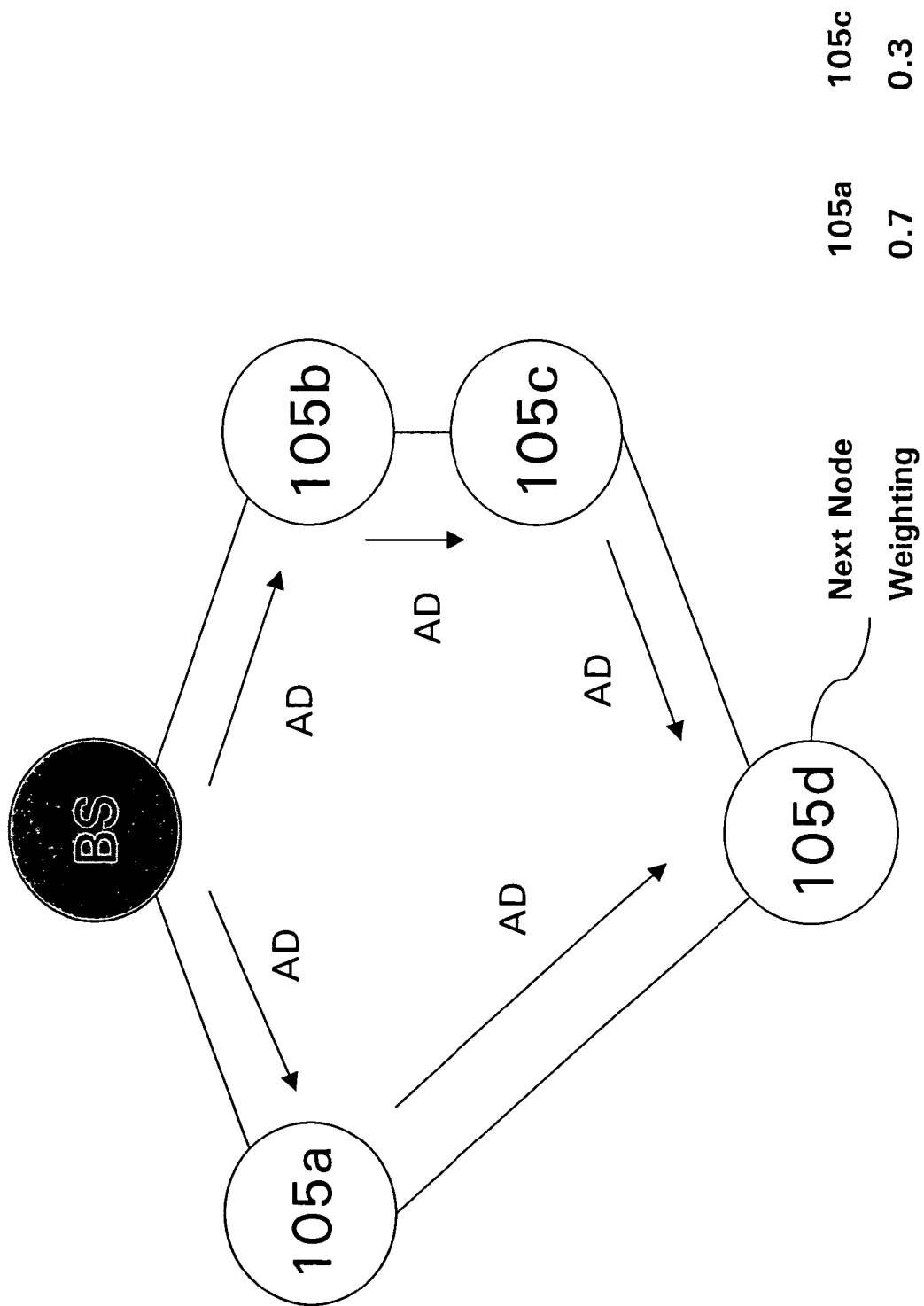
FIG. 4a is a schematic diagram illustrating aspects of the method of FIG. 3.

At step S 3.1 the base station 103 releases an advertisement packet AD, which is flooded through the network 100, as shown in FIG. 4*a*. This step is performed at regular, configurable intervals, by the generating program 211, which creates an advertisement packet AD and sends it to the radio transmitter 209.

Referring to FIG. 5*a*, the advertisement packet AD comprises an identifier 501 of the base station and a unique generating event identifier 503, which is a form of time stamp, indicating a time of creation of the packet AD. The advertisement packets AD are small and have little impact on network bandwidth.

At step S 3.2 the advertisement packets AD are received at devices 105*a*, 105*b*. For each device the advertisement packet AD is passed, via an interface, to the acknowledgement program 233.

At step S 3.3 acknowledgement program 233 firstly determines the type of packet that has been received. There are several ways of doing this, one of which involves packets carrying an identifier of packet type (for example, a field in a packet header could specify a type of packet) and depends on nodes 101 having a program that decodes the type identifier.

In the present embodiment, packet headers specify a packet type identifier 500, as can be seen in FIGS. 5*a*, 5*b* and 5c, and the acknowledgement program 233 and decoding program 213 running on devices 105 and base station 103 respectively read the packet header in order to identify packet type.

The packet identifier 500 may include one of the following types:

| PACKET TYPE | ACTION |
|---|---|
| Advert (AD) | Broadcast packet to all neighbouring devices, send acknowledgement packet back to base station |
| Acknowledgement (ACK) | Append device ID to packet and forward to preferred next hop device (described in more detail later) |
| Downstream data | Read route from packet and send to next hop neighbour in the route (described in more detail later) |
| Upstream data | Forward to preferred next hop device |

Other packet types are possible.

Having established that the received packet is an advertisement type packet AD, the acknowledgement program 233 passes the advertisement type packet AD to the updating program 231 in order to update the routing table of the device 105a. As stated above, each device maintains a routing table detailing "next hop" devices en route for the base station 103. For example, referring to FIG. 4a, the routing table of device 105d, which is maintained by the updating program 231, contains entries for devices 105a and 105c. The updating program 231 receives identification of its "next hop" neighbours from, e.g. a link layer protocol, which establishes neighbourhood information through simple signalling, as is known in the art.

As part of maintaining the routing table, the updating program 231 monitors the number and frequency of advertisement type packets that it receives from its "next hop" neighbours. This information is used by the updating program 231 to determine a preference rating, in the form of a weighting, for routing packets via these next hop devices.

Considering device 105a, at step S 3.4 the updating program 231 modifies weights in the routing table according to the following equations:

$$r_{s,m}^{i}(t+1) = \frac{r_{s,m}^{i}(t) + \delta r}{1 + \delta r} \quad (1)$$

$$r_{s,l}^{i}(t+1) = \frac{r_{s,l}^{i}(t)}{1 + \delta r} \quad (2)$$

$$\delta r = \frac{max - min}{age} + min \quad (3)$$

where
r is the weight calculated for a next hop device;
i represents the device at which a packet has been received;
s represents the source device of the packet (the base station 103);
m represents the device from which the packet was received (one of the neighbouring next hop devices);
l represents one of the other next hop devices (ones from which the packet was not received);
δr is a configurable reinforcement parameter;
min, max represent a minimum and maximum value respectively for reinforcement parameter;
age represents age of a the packet; and
t and (t+1) indicate (discrete) time.

Initially, a neighbouring device, from which a packet is received, is assigned a weight of 1.0. Thereafter weights are modified in accordance with Equations (1)-(3).

Equation (1) specifies the new reinforced weight associated with next hop device m. The weights in the routing table always sum to 1 and thus weights associated with other neighbours must be modified to reflect the change. Equation (2) specifies the amount by which the weights for all other neighbours are reduced.

Equation (3) specifies an example reinforcement parameter that is used in Equations (1) and (2).

The reinforcement parameter δr modifies the amount by which the weights are adjusted in Equations (1) and (2), and ranges between a maximum value (max) and a minimum value (min). The precise value is determined by the age of packets, as can be determined from the time stamp identifier 503 in the advertisement packets AD. Alternative reinforcement parameters are possible.

As can be seen from Equations (1)-(3), the rate at which packets propagate through a network affects routing tables. If packets are delayed (each device 105 can maintain a data queue (not shown), which holds data that needs to be either forwarded or processed by the device 105), they will have less influence on a routing table than those that have travelled via a less congested route, because fewer of them may be received within a given time frame and because older packets have a lesser effect on the weights within the routing table.

Having updated the weights as described above, the updating program 231 determines whether an advertisement type packet AD bearing this time stamp 503 has previously been received from the base station 103. If such a packet has already been received, the advertisement packet is discarded, step S 3.5.

However, if this is the first time an advertisement packet AD bearing this time stamp 503 has been received, the acknowledgement program 233 broadcasts the packet AD to all neighbouring devices, at step S 3.6, which in this case is device 105d, and generates (and sends out) an acknowledgement packet ACK.

For the purposes of the present exemplifying example, the acknowledgement packet ACK generated by device 105a is not discussed further (acknowledgement packets ACK are discussed below, with reference to device 105d).

The advertisement packet AD broadcast by 105a at step S 3.6 to device 105d is received and handled by the updating and acknowledgement programs 231, 233 respectively on device 105d, as described above at steps S 3.2-S 3.6. Assuming that this is the first time an advertisement packet AD bearing this time stamp 503 has been received at device 105d, the acknowledgement program 233 broadcasts the packet AD to all neighbouring devices, which in this case is devices 105a and 105c, and then generates an acknowledgement packet ACK (step S 3.6)

An example acknowledgement packet ACK is shown in FIG. 5b, comprising an identifier 511 representative of whichever device first created the acknowledgement packet ACK (here device 105d), an identifier 513 representative of the ad event 503 to which the ACK is responding, and the route 515 taken by the packet ACK (here device 105d, as this is the start of the route 515). The route part 515 is modified as the packet ACK moves through the network.

At step S 3.7.1, the acknowledgement program 233 selects a next hop device (here either 105a or 105c) to send the acknowledgement packet ACK to. This comprises consulting the routing table and selecting whichever device has the highest weighting. Referring to FIG. 4a, device 105a has a higher weighting, so device 105a is selected, and the acknowledgement packet ACK is sent from device 105d to device 105a, as shown in FIG. 4b.

At step S 3.7.2 the acknowledgement program 233 inserts an identifier that is representative of the device 105d to the route part 515 of the acknowledgement packet ACK generated at step S 3.6, and at step S 3.7.3 the acknowledgement packet ACK is sent to the whichever next hop device was selected at step S 3.7.1

As can be seen from the logic step S 3.7.4, depending on the type of node 101 selected at step S 3.7.1 (i.e. either device 105 or base station 103), the sequence continues to step S 3.8 or step S 3.9.1. At this stage of the present example the packet ACK is sent to another device 105d, so the process moves to step S 3.8.

At step S 3.8, the acknowledgement packet ACK is received at the selected device 105a, whereupon steps S 3.3-S 3.7.3 are carried out. At step S 3.3, acknowledgement program 233 firstly determines the type of packet that has been received (as described above). This packet is an acknowledgement type packet ACK, so the acknowledgement program 233 jumps straight to step S 3.7.1.

At step S 3.7.1, the acknowledgement program 233 selects a next hop device (here either 105d or 103) to send the acknowledgement packet ACK to. In this case one of the next hops is the intended destination of the packet, i.e. the base station 103. Having established that the received packet is an acknowledgement packet ACK originating from another device 105d, at step S 3.7.2, the acknowledgement program 233 adds an identifier, representative of the device 105a to the route part 515 of the acknowledgement packet ACK. FIG. 5c shows the acknowledgement packet ACK having passed through device 105a; it now includes an identifier representative of this device 105a in the route part 515.

Next, at step S 3.7.3, the acknowledgement packet ACK is sent to the next hop device selected at S 3.7.1.

At this point in the sequence, the type of node 101 selected at step S 3.7.1 is a base station 103, so logic step S 3.7.4 progresses to step S 3.9.1, whereupon the decoding program 213 determines that the received packet is an acknowledgement type packet ACK (as described at step S 3.3). At step S 3.9.2 the decoding program 213 retrieves the route part 515 and the identifier 511 representative of the originating device 105d from the packet ACK. At step S 3.10, the retrieved route part 515 is stored as a valid route to the originating device 105d in a routing store 241, e.g. in the memory unit 203.

For example, for device 105d, the routing store 241 will read:

Destination node 105d
Route 105a, 105d

The example given above only includes 2 devices 105a, 105d; it will be appreciated that in a wireless network there may be many more devices, so that the route part 515 of the acknowledgment packet ACK may be far longer than that shown in FIG. 5c.

FIGS. 3a and 3b thus show a method for establishing a route to devices in the wireless network 100. As the route part 515 is generated dynamically, in response to advertisement packets AD that are generated periodically, and as the route part 515 only comprises identifiers representative of devices 105 that are active in the network 100, the routes stored by the base station 103 are likely to be valid.

Figure 6A:
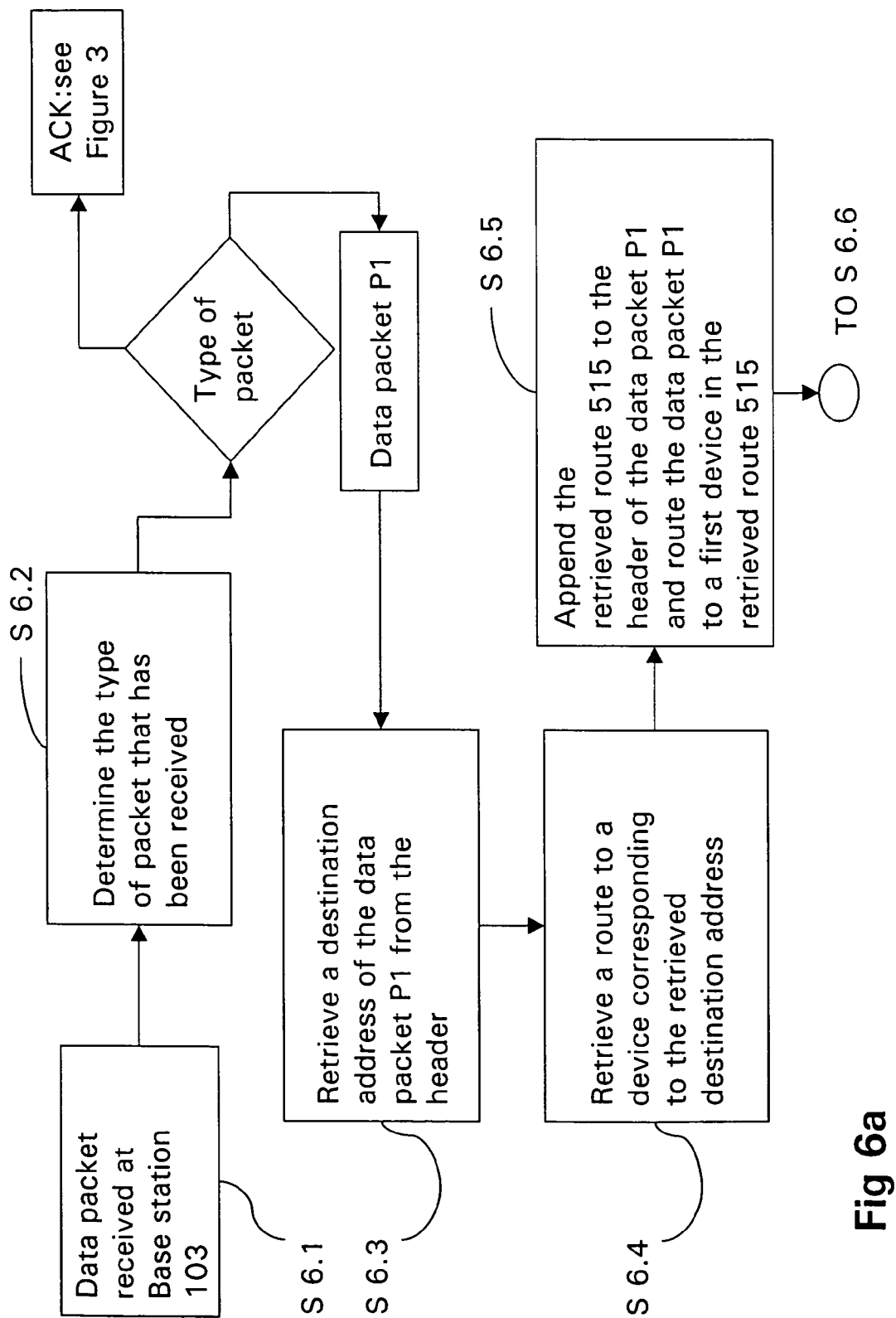
FIGS. 6a and 6b constitute a flow diagram showing a method of routing a packet destined for a wireless device in the wireless network, according to an embodiment of the invention.
Figure 6B:
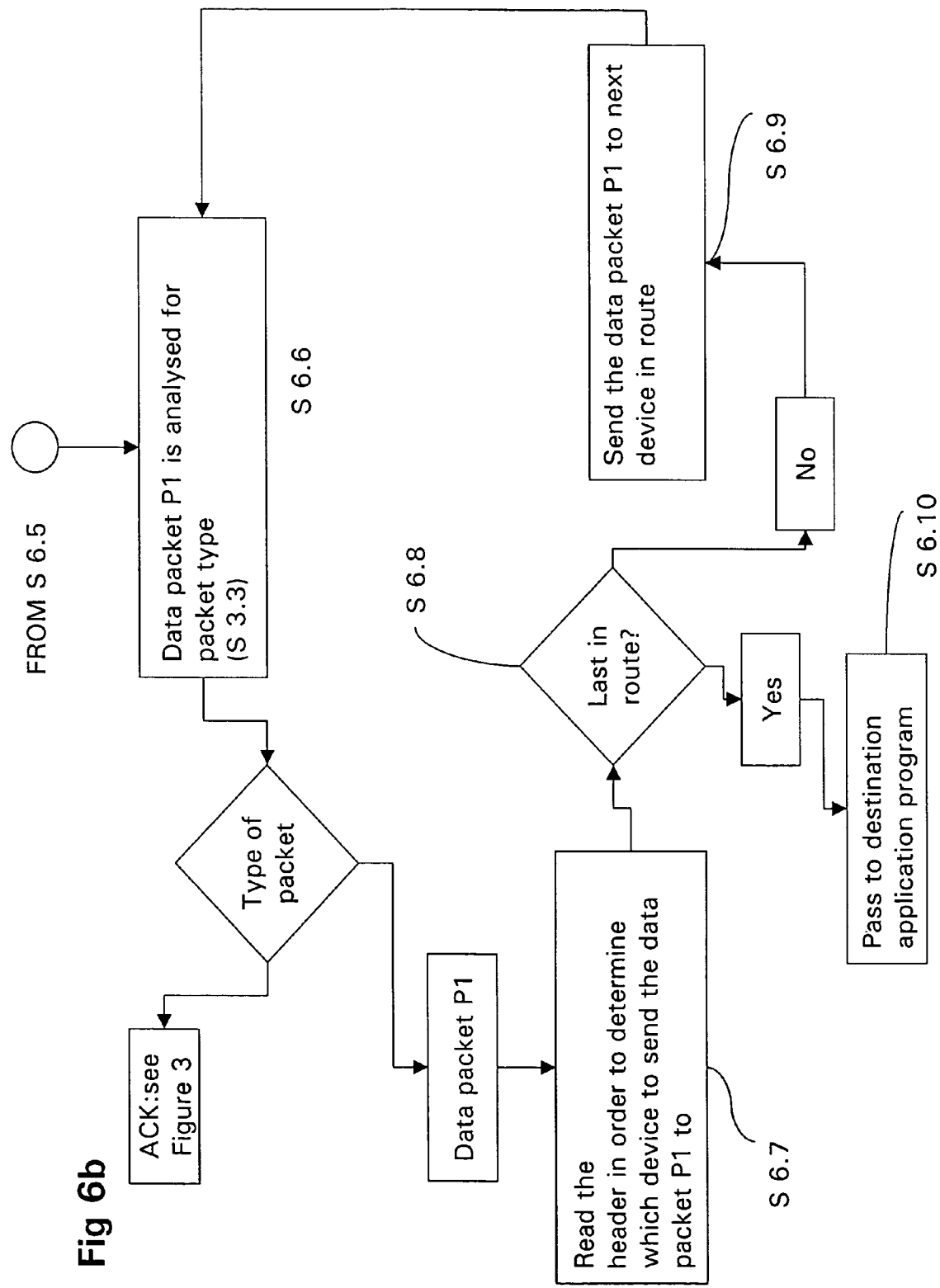

The routing of a packet P1 from the fixed network 110 will now be described with reference to FIGS. 6a and 6b, which collectively provide a flow diagram showing operation of the base station 103 and devices 105 when routing data packets.

At step S 6.1 a data packet P1 is received at the base station 103 from the fixed network 110, whereupon it is passed to the decoding program 213. The decoding program 213 determines that the received packet is a data packet P1 destined for one of the wireless devices (as described at step S 3.3: the packet is a "Downstream data" type packet), at step S 6.2, whereupon the data packet P1 is passed to the routing program 215.

At step S 6.3, the routing program 215 retrieves a destination address of the data packet P1 from the header thereof, as is known in the art, and at step S 6.4 accesses the routing store 241 to retrieve a route to the device corresponding to the retrieved destination address (the retrieved route is the route part 515 that was stored in the routing store 241 at step S 3.10).

At step S 6.5, the routing program 215 replaces the destination address part of the header with the retrieved route 515, adds a packet type identifier 500 representative of a downstream packet type, and routes the data packet P1 to a first device in the retrieved route 515. For example, if a packet, destined for device 105d, were to be received at the base station 103, and if the routing store 241 contained a route entry of:

[105a, 105d]

for device 105d, the routing program 215 would add route 105a, 105d to the data packet P1, and send the data packet P1 to device 105a.

At step S 6.6, the data packet P1 is received at device 105a, whereupon it is analysed for packet type, as described above with reference to Step S 3.3. Upon examination of the packet type identifier 500, the packet type is determined to be "downstream", whereupon the packet is passed to the forwarding program 235, which, at step S 6.7, reads the header in order to determine which device to send the data packet P1 to.

Firstly, at step S 6.8, the forwarding program 235 determines whether this is the last device in the route. In this case, it is not, and device 105d is determined to be the next device in the route. Thus at step S 6.9, the forwarding program 235 sends the data packet P1 to device 105d (of course in this example there is only one device 105d attached downstream of device 105a, so the packet could be routed to device 105d without needing to review the header).

Steps S 6.6-S 6.8 are then repeated, for device 105d. Upon passing through step S 6.8, the forwarding program 235 determines that device 105d is the last device in the route. Thus the data packet P1 is passed, at step S 6.10, onto whichever application program it is destined for, as is well known in the art.

As stated above, one of the advantages of embodiments of the invention is that identification of routes within the wireless network is self-organising. This can be seen from the following example, which describes route identification when one of the wireless devices 105 becomes inactive.

Figure 4B:
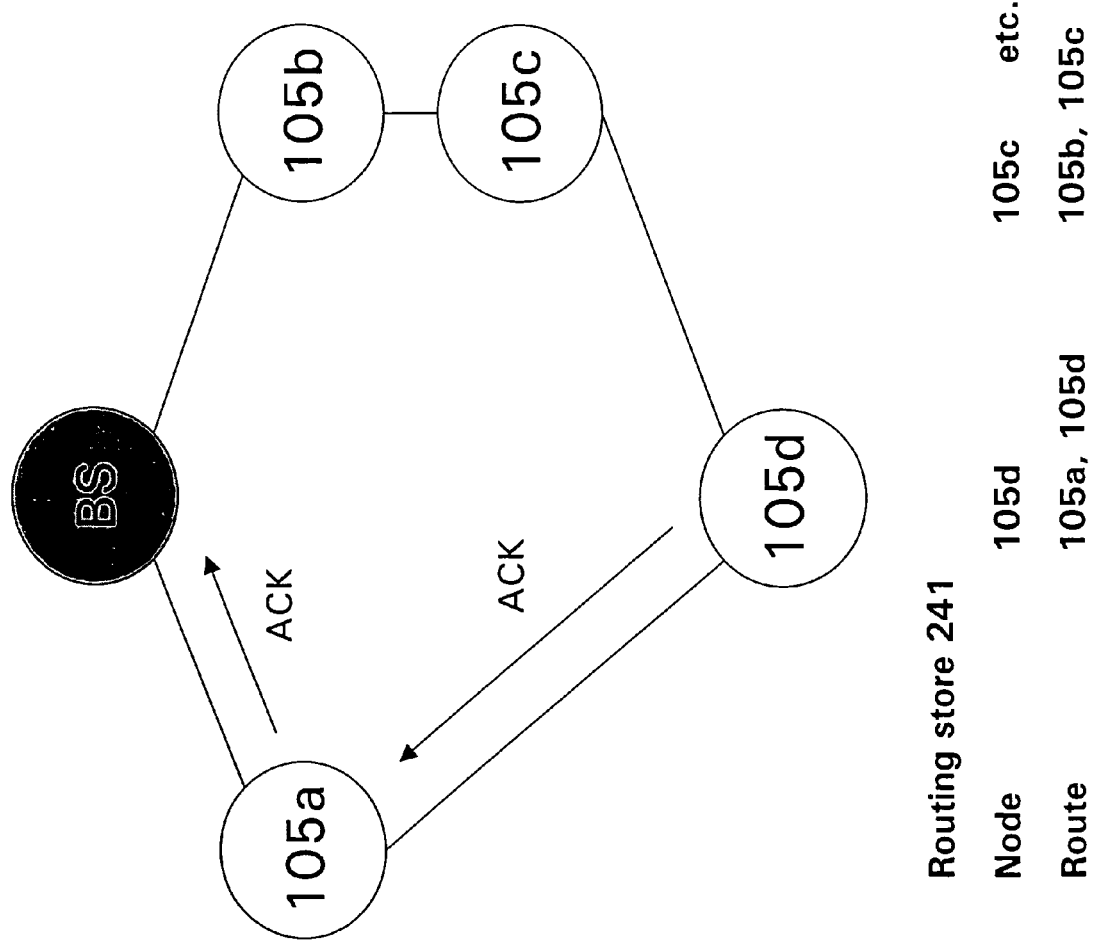
FIG. 4b is a schematic diagram illustrating further aspects of the method of FIG. 3.

FIG. 7 shows the wireless network of FIGS. 4a and 4b, where one of the wireless devices 105a has become inactive. This can happen when, for example, a user has turned the device 105a off, or when the user moves out of range of any of the devices connected to the base station 103.

As described with reference to FIG. 3, the base station 103 periodically issues advertisement packets AD. As device 105a is no longer active, the advertisement packets AD can only reach device 105d via device 105c. Thus weights in the routing table, maintained on each of the devices 105, and detailing all available next hops to the base station 103, would be modified (step S 3.4) to favour device 105c (e.g. if a node becomes inactive, then in the first instance the weight previously associated with that node may be redistributed to the other neighbours. In the present example, a weight of 0.0 is assigned to device 105a and a weight of 1.0 is assigned to device 105c, as shown in FIG. 7)

As a result, the acknowledgement packets ACK, issued as described at steps S 3.6-S 3.10, will follow route path 105d, 105c, and 105b to reach the base station 103, so that the entry in the routing store 241 will read:

Destination node 105d
Route 105b, 105c, 105d

Thus because
a) the base station 103 sends out advertisement packets AD periodically, and
b) establishing a route between a device 105 and the base station 103 is dependent on routing tables maintained on the device, which is essentially a measure of the ability of neighbouring devices to forward the advertisement packets AD to that device 105 (as given by equations (1)-(3)), if any of the neighbouring devices become inactive, the routing table will adapt the weights in accordance with equations (1)-(3), and will thereby automatically identify whichever neighbour is most suitable for transporting advertisement packets ACK towards the base station 103.

FREQUENCY OF GENERATING ADVERTISEMENT PACKETS

The embodiment described above assumes that the interval between broadcast of advertisement packets AD is fixed. However, in practice, the rate at which advertisement packets AD are required to be generated is dependent on the nature of the wireless environment: if the environment is relatively static—e.g. devices remain active and in the same place for some time—the routing tables on devices will be correspondingly static, which means that the base station 103 could issue advertisement packets AD relatively infrequently. Alternatively, if the wireless environment is dynamic—e.g. devices rapidly change status from active to inactive (and vice-versa) and users are in range for a short period of time—the routing tables will need to be updated relatively frequently, to enable that the base station 103 to gather valid routes.

Other embodiments of the invention thus adapt the temporal interval in accordance with the rate of change of the wireless network, or the mobility of devices. The embodiments include a mechanism for determining the changes in the wireless environment, for quantifying those changes, and for modifying the temporal interval in accordance therewith.

Specifically, in addition to the programs 231, 233, 235 loaded and run on the devices 105 as described above, each device has a logging program 237, which, for each neighbouring device, records the number of times the device has failed to contact the neighbouring device (when a source node 101 tries to send data to a destination node, if data is not received successfully at the destination node, the source node receives a packet indicating failure to deliver the data to the destination node). Referring again to FIG. 4a, device 105d maintains a log of the number of times it has failed to connect to devices 105a and 105c respectively. The log can be stored in the memory store 223 of the device 105d.

This log is reset each time a fresh advertisement packet AD is received at the device 105d, after the device 105d has created an acknowledgement packet ACK (step S 3.6), and has appended the number of failures to the acknowledgement packet, so that the log represents a measure of the activeness (of neighbouring) devices in periods between successive advertisement packets AD.

Figure 8:
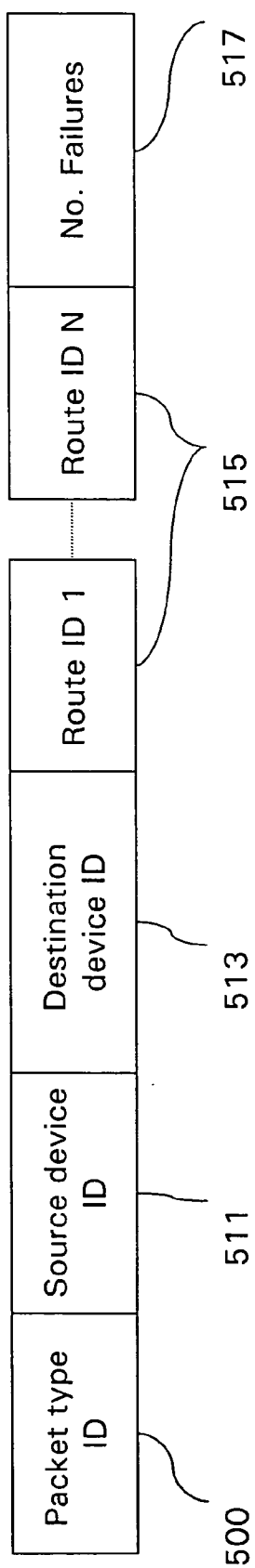
FIG. 8 is a schematic diagram showing constituent parts of a modified acknowledgement packet generated according to an embodiment of the invention.

This information is thus conveyed to the base station 103 by means of the acknowledgement packets ACK: the acknowledgement packet ACK generated at step S 3.6 includes an additional field, detailing number of failures 517, as shown in FIG. 8.

The base station 103 does not need to know which neighbouring device(s) has/have become inactive—it simply needs to know that there is a change to the wireless network 100, namely that some of the devices 105 are no longer active.

Figure 9:
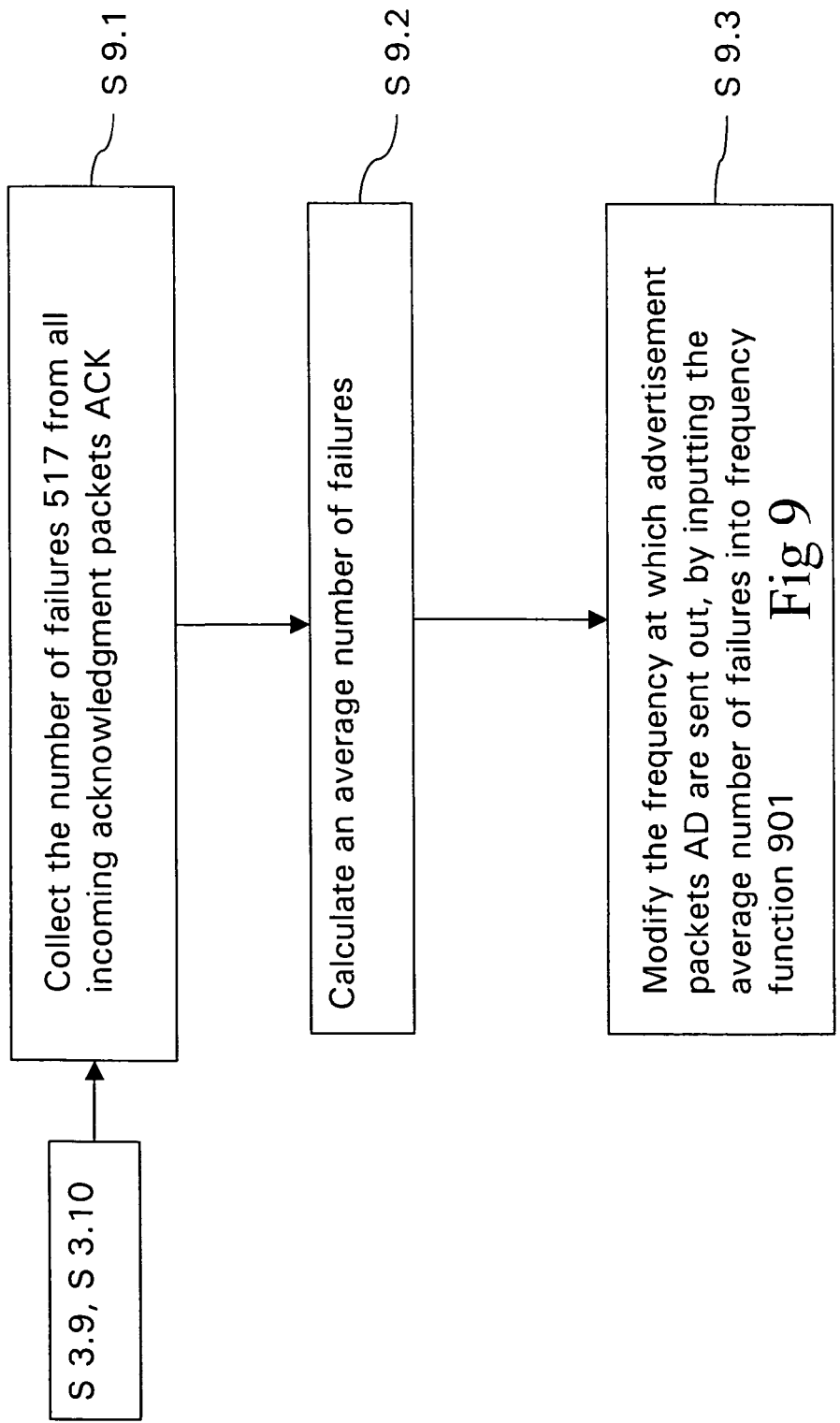
FIG. 9 is a flow diagram showing a method of modifying the frequency with which advertisement packets are issued by the base station, according to an embodiment of the invention.

When acknowledgement packets ACK are received at the base station 103 (steps S 3.9, S 3.10), the base station 103 performs the following steps: Referring to FIG. 9, at step S 9.1, the decoding program 213 collects the number of failures 517 from all incoming acknowledgment packets ACK, and adds up the number of packets that reported non-zero failures. At step S 9.2 the decoding program 213 calculates an average number of failures, by dividing the total number of failures by the number of packets that reported non-zero failures. At step S 9.3, the decoding program 213 modifies the temporal interval by inputting the average number of failures into a frequency function 901.

Figure 10:
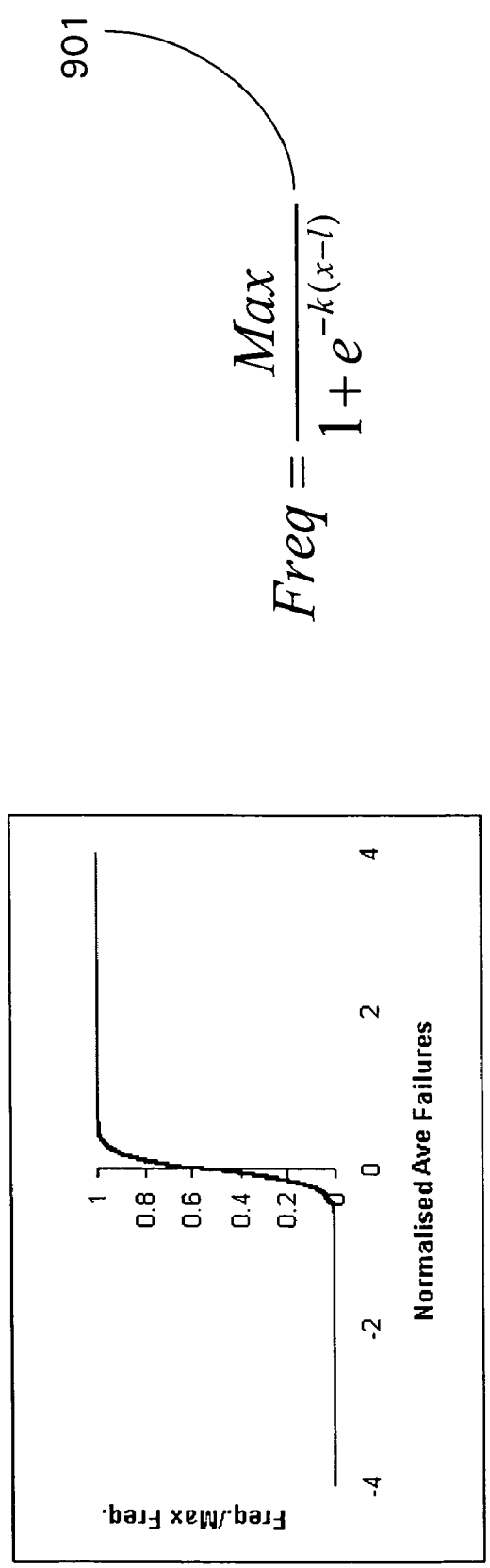
FIG. 10 is a graph showing the effect of the method of FIG. 9 on the advertising frequency.

In one embodiment, the frequency function 901 may be a sigmoid function, which smoothly varies the temporal interval based on the current number of failures. This function 901 is relatively insensitive to a small number of failures but decreases the temporal interval rapidly as the number of failures begins to grow, as shown in FIG. 10 (in FIG. 10 the temporal interval is expressed as frequency):

$$\frac{1}{\text{Interval}} = \frac{\text{Max}}{1 + e^{-k(x-l)}} \qquad \text{Equation (4)}$$

x represents the average number of failures reported to a base station 103,
l is a normalising constant,
Max is the minimum temporal interval, and
k is a constant that controls the gradient. A small value of k yields a smoothly varying function, and as k increases the equation approximates a step function.

ADDITIONAL DETAILS

Devices 105 can include very simple devices that may just be shipped at very low cost and, e.g. just allow a few SMS messages to be sent. For example these devices may not want anything routing to them but may just respond to some advert or automatically register with a supplier to start the guarantee period on a consumer item etc. Thus not every device would need to be have full two-way communication capability and would not need to generate acknowledgement packets ACK to inform the base station of a valid route. This has the advantage of reducing the overhead on the communication channel and base stations.

When a device changes status, from inactive to active, (e.g. because the user of that device has changed the configuration of the device) this causes the acknowledgement and forwarding programs 233, 235 to be activated, and the device starts generating acknowledgement packets ACK in response to the advertising packets AD. The acknowledgement packets ACK propagate through the network 100 as described above with reference to FIG. 3, and the base station 103 stores the route to that device in the routing store 241. Data can then be routed to that device.

In addition, whereas the aforedescribed embodiment details the routing of AD, ACK, and downstream packets, it should also be understood that the embodiment of the invention also provides for the routing of upstream packets, again using the routing weights contained within the routing tables. The routing of upstream packets is substantially similar to that of downstream packets as already described, albeit in the opposite direction.

As will be understood by those skilled in the art, the invention described above may be embodied in one or more computer programs. These programs can be contained on various transmission and/or storage mediums such as a floppy disc, CD-ROM, or other optically readable medium, or magnetic tape so that the programs can be loaded onto one or more general purpose computers or could be downloaded over a computer network using a suitable transmission medium.

The programs 211, 213, 215, 231, 233, 235, 237 of the present invention are conveniently written using the C programming language, but it is to be understood that this is inessential to the invention.

The invention claimed is:

1. Apparatus for varying the rate at which signals are broadcast into a wireless network, wherein the signals are broadcast to facilitate route identification of a route along which data packets are subsequently passed, the apparatus comprising:
   a. receiving means arranged to receive data representative of the status of at least one wireless device in the wireless network, and
   b. modifying means arranged to modify the rate at which the signals are broadcast in accordance with the received data;
   wherein the modifying means includes means operable to execute a sigmoid function in dependence on the received data, and provides as output a modified rate of issuing broadcast signals.

2. A method of identifying a route in a wireless network between a base station and a destination wireless device, the route comprising a sequence of wireless devices from the destination wireless device to the base station, the method comprising:
   (i) from the base station, sending advertisement signals into the wireless network;
   (ii) in response to receipt at the destination wireless device of one of the advertisement signals, generating an acknowledgement signal at the destination wireless device, the acknowledgement signal including an identifier representative of the destination wireless device;
   (iii) transmitting the acknowledgement signal sequentially via each of the wireless devices of the sequence to the base station;
   (iv) at each of the wireless devices of the sequence, modifying the acknowledgement signal received from the preceding wireless device by adding to the acknowledgement signal an identifier representative of the identity of the respective wireless device, and transmitting the modified signal, so that as the signal progresses along the sequence of wireless devices from the destination wireless device to the base station it acquires a sequence of identifiers representative of the identifiers of the wireless devices of the sequence, the sequence of identifiers representing a route between the base station and the destination wireless device; and
   (v) at the base station, receiving the modified acknowledgement signal transmitted from the last wireless device of the sequence, and storing the route so obtained;
   wherein a temporal interval between advertisement signals being sent into the wireless network from the base station varies based on a rate of changes in status, between active and inactive, of the wireless devices.

3. A method of identifying a route in a wireless network between a base station and a destination wireless device, the route comprising a sequence of wireless devices from the destination wireless device to the base station, the method comprising:
   (i) from the base station, sending advertisement signals into the wireless network;
   (ii) (in response to receipt at the destination wireless device of one of the advertisement signals, generating an acknowledgement signal at the destination wireless device, the acknowledgement signal including an identifier representative of the destination wireless device;
   (iii) transmitting the acknowledgement signal sequentially via each of the wireless devices of the sequence to the base station;
   (iv) at each of the wireless devices of the sequence, modifying the acknowledgement signal received from the preceding wireless device by adding to the acknowledgement signal an identifier representative of the identity of the respective wireless device, and transmitting the modified signal, so that as the signal progresses along the sequence of wireless devices from the destination wireless device to the base station it acquires a sequence of identifiers representative of the identifiers of the wireless devices of the sequence, the sequence of identifiers representing a route between the base station and the destination wireless device; and
   (v) at the base station, receiving the modified acknowledgement signal transmitted from the last wireless device of the sequence, and storing the route so obtained;
   wherein a temporal interval between advertisement signals being sent into the wireless network from the base station varies based on a rate of changes in status, between active and inactive, of the wireless devices; and
   wherein the rate of changes in status of the wireless devices is determined based on the number of failures of wireless devices to connect to neighboring wireless devices.

4. A method of identifying a destination wireless device, for use in identifying a route, for subsequent transmission of date packets, between a base station and the destination wireless device, wherein the destination wireless device is in range of at least one other wireless device located within a wireless network, the wireless network comprising a base station operable to communicate with the wireless devices in the wireless network, the method comprising the steps of:
   from the base station, sending advertisement signals into the wireless network;
   receiving at the destination wireless device one of the advertisement signals;

generating an acknowledgement signal in response to receipt of the one of the advertisement signals at the destination wireless device, the acknowledgement signal including an identifier representative of the destination wireless device;

sending the acknowledgement signal from the destination wireless device to the base station via the at least one other wireless device;

wherein each of the at least one other wireless device modifies the acknowledgement signal by adding (i) an identifier representative of its identity and (ii) the number of failures to connect to neighboring wireless devices, before sending the acknowledgement signal on; and wherein a temporal interval between advertisement signals being sent into the wireless network from the base station varies based on the number of failures.

5. A wireless network comprising:

a base station; and a plurality of wireless devices; and a destination wireless device;

wherein the base station broadcasts advertisement signals into the wireless network;

the destination wireless devices receives one of the advertisement signals and generates an acknowledgement signal in response to receipt of said one of the advertisement signals, wherein the acknowledgement signal including an identifier representative of its identity, and transmits the acknowledgement signal to the base station via each of the plurality of wireless devices in a sequence;

one of the plurality of wireless devices receives the acknowledgement signal, modifies the acknowledgement signal by adding an identifier representative of its identity, and transmits the modified acknowledgement signal to the base station via the sequence of wireless devices; and the base station receives the modified acknowledgement signal transmitted from the sequence of wireless devices and stores the modified acknowledgement signal which includes a sequence of identifiers representative of the identifiers of the destination wireless device and the sequence of wireless devices, the sequence of identifiers representing a route between the base station and the destination wireless device for subsequent transmission of data packets;

wherein the rate at which the base station broadcasts advertisement signals into the wireless network varies based on the amount of activity of the network as determined by the wireless devices changing status between inactive and active.

6. A wireless network comprising:

a base station; and a plurality of wireless devices; and a destination wireless device;

wherein the base station broadcasts advertisement signals into the wireless network;

the destination wireless devices receives one of the advertisement signals and generates an acknowledgement signal in response to receipt of said one of the advertisement signals, wherein the acknowledgement signal including an identifier representative of its identity, and transmits the acknowledgement signal to the base station via each of the plurality of wireless devices in a sequence;

one of the plurality of wireless devices receives the acknowledgement signal, modifies the acknowledgement signal by adding an identifier representative of its identity, and transmits the modified acknowledgement signal to the base station via the sequence of wireless devices; and the base station receives the modified acknowledgement signal transmitted from the sequence of wireless devices and stores the modified acknowledgement signal which includes a sequence of identifiers representative of the identifiers of the destination wireless device and the sequence of wireless devices, the sequence of identifiers representing a route between the base station and the destination wireless device for subsequent transmission of data packets;

wherein the rate at which the base station broadcasts advertisement signals into the wireless network varies based on the amount of activity of the network as determined by the wireless devices changing status between inactive and active; and wherein the amount of activity is determined using the number of failures of wireless devices to connect to neighboring wireless devices.

7. The wireless network as in claim 6 wherein said one of the wireless devices further modifies the acknowledgement signal by adding its number of failures to connect to neighboring wireless devices before transmitting the acknowledgement signal to the base station.

* * * * *